United States Patent [19]
Williams et al.

[11] 3,749,340
[45] July 31, 1973

[54] MOUNTING ASSEMBLY FOR LOOMS AND THE LIKE

[75] Inventors: Arthur Williams; Donald Ray Davenport, both of Greenville, S.C.

[73] Assignee: Richen Inc., Greenville, S.C.

[22] Filed: Oct. 19, 1970

[21] Appl. No.: 81,931

[52] U.S. Cl.................. 248/24, 248/22, 248/358 R
[51] Int. Cl............................................. F16f 15/00
[58] Field of Search ...................... 248/7, 9, 10, 15, 248/22, 24, 26, 358 R; 267/152, 153; 188/1 B

[56] References Cited
UNITED STATES PATENTS

| | | | |
|---|---|---|---|
| 2,720,931 | 10/1955 | Thannhauser ...................... | 248/9 X |
| 2,969,656 | 1/1961 | Reuter .............................. | 248/8 X |
| 3,282,543 | 11/1966 | Engels................................ | 248/22 |
| 2,044,649 | 6/1936 | Swennes et al. .................... | 248/7 |
| 3,311,331 | 3/1967 | Steimen ........................... | 248/24 X |
| 2,547,075 | 4/1951 | Cook ................................... | 248/24 |
| 2,397,804 | 4/1946 | Nakken et al.................. | 248/20 UX |

FOREIGN PATENTS OR APPLICATIONS

| | | | |
|---|---|---|---|
| 738,791 | 7/1943 | Germany .............................. | 248/20 |
| 159,589 | 7/1957 | Sweden ........................... | 248/358 R |

*Primary Examiner*—J. Franklin Foss
*Attorney*—Lyon & Lyon

[57] ABSTRACT

An assembly is disclosed for mounting and supporting looms and other machines in which vibration produced during operation is controlled. The assembly includes a first plate which is adapted to support the foot of the loom on one surface and a second plate which is attached to and supports the first plate. Resilient means such as a grommet are positioned between and interconnect the first and second plates.

12 Claims, 5 Drawing Figures

PATENTED JUL 31 1973
3,749,340
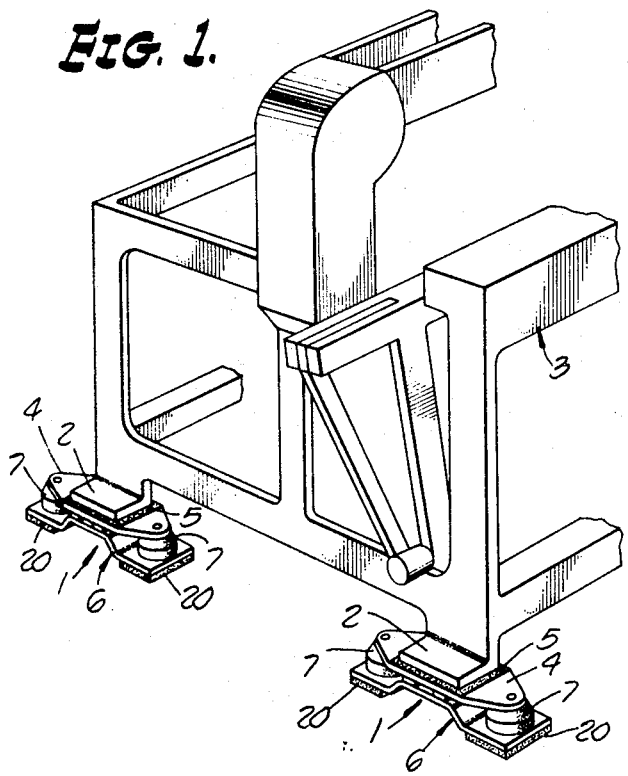
FIG. 1.
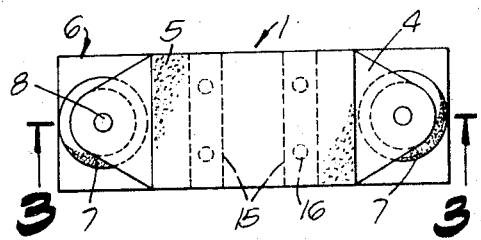
FIG. 2.
FIG. 4.
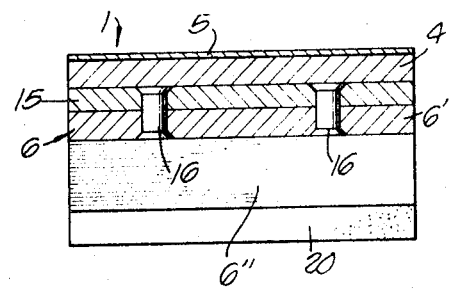
FIG. 3.
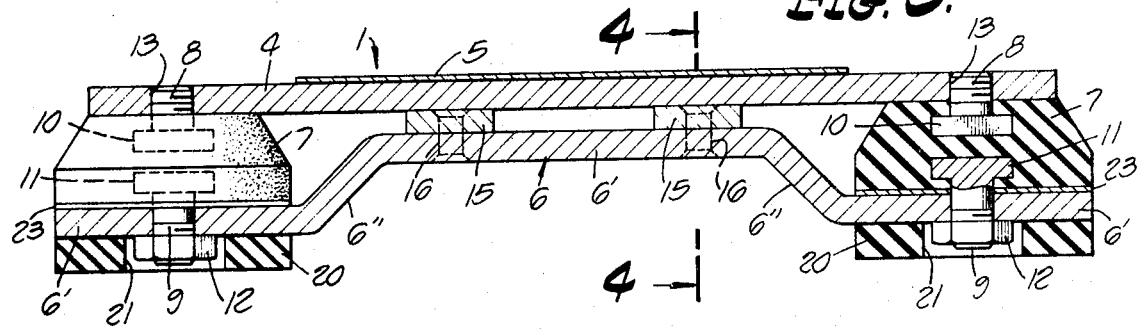
FIG. 5.
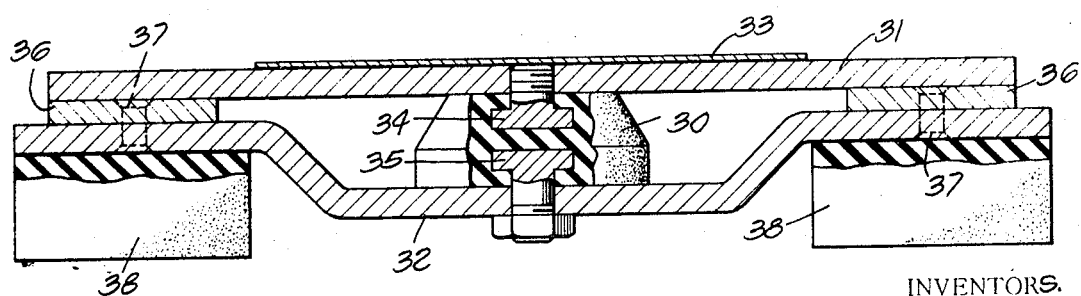
INVENTORS.
ARTHUR WILLIAMS
DONALD RAY DAVENPORT
BY
Lyon & Lyon
ATTORNEYS.

MOUNTING ASSEMBLY FOR LOOMS AND THE LIKE

BACKGROUND OF THE INVENTION

In weaving mills in which fabric is produced from yarn, efficient utilization of the available facilities requires that large numbers of looms be mounted in rather closely spaced relation. The most frequently used method of mounting simply has been to bolt the feet of the loom directly and rigidly to the floor on which it rests. Due to the inherent manner of operation, however, looms produce severe vibration during operation. This is an especially acute problem since even a small loom weighs several hundred pounds and such a mass oscillating back and forth continuously at a rather high rate of speed produces significant strain upon the floor and can actually cause the floor to crack and the entire building to be seriously weakened.

Moreover, since even a small mill may have 100 or 500 or more looms operating at the same time, it is entirely feasible that the building can be weakened to the point of collapse, particularly in situations where adjacent looms are operating in a substantially syncronized manner.

In previous attempts to solve this problem rubber or felt pads have been inserted beneath the loom end frames between the loom feet and the floor hopefully to suppress the vibrations. This has not been successful, however, since the feet of the loom are still in direct contact with and connected to the floor by bolts or other connecting means. In fact, in any arrangement where the loom is bolted or otherwise mounted directly and rigidly on the floor, it is exceedingly difficult to dampen or supress significantly the vibrations, which are readily transmitted directly to the floor and building. It is apparent, therefore, that a satisfactory arrangement for controlling loom vibrations should permit relative movement between the loom and the floor on which it is mounted.

SUMMARY OF THE INVENTION

It is a principal object of the present invention, therefore, to provide an assembly for mounting looms in which the vibration of the loom during operation is controlled by substantially eliminating transmission of the vibrations to the floor and building. Such assembly includes a first plate which is adapted to support the foot of the loom on one surface and a second plate attached to and supporting the first plate. Resilient means are positioned between the first and second plates and connect the same together, whereby the first plate and loom supported thereon can vibrate during normal operation in a plane parallel to the second plate.

Another object of the present invention is to provide a mounting assembly which is positioned directly on the mill floor and the loom is supported thereon simply by positioning one assembly beneath each foot of the loom.

It is still a further object of this invention to provide an assembly for mounting looms and similar machines in which the assembly need not be physically connected to the mill floor.

Yet another object of this invention is the provision of a mounting assembly for looms and the like in which the loom is supported on the assembly without direct or positive attachment thereto.

Another object of this invention is to provide a mounting assembly of the type described which can be readily and relatively easily postioned beneath the feet of a loom with a minimum of time and labor without requiring modification of the basic loom.

Other objects, features and advantages of this invention will become apparent after a reading of the following more detailed description.

DESCRIPTION OF PREFERRED EMBODIMENTS

In the drawings:

FIG. 1 is a fragmentary perspective view illustrating the mounting assembly of this invention supporting a loom.

FIG. 2 is a top plan view of the mounting assembly.

FIG. 3 is an enlarged section view taken on line 3—3 of FIG. 2.

FIG. 4 is a section view taken along line 4—4 of FIG. 3.

FIG. 5 is a partial section view illustrating a further embodiment of the mounting assembly.

Referring now more particularly to the drawings, FIG. 1 illustrates the mounting assembly designated generally by the numeral 1 positioned beneath a loom supporting the feet 2 of the loom, which is illustrated only schematically and denoted by the numeral 3. As will be appreciated, the mounting assembly is placed in position to support the loom merely by raising the loom and positioning properly the mounting assembly beneath the loom feet. Once the loom is thus positioned, it is ready for use without further adjustment or modification.

In FIGS. 2 through 4, the mounting assembly is shown in greater detail. The assembly includes a first plate 4 which is adapted to support the loom foot on its upper surface. To facilitate retention of the loom foot on plate 4, the upper surface preferably has a thin coating of an abrasive substance, denoted by numeral 5, which may be a crocus-type material. The abrasive can be applied directly to the surface of the plate 4 as for example in the form of a mixture of the abrasive and a pressure sensitive adhesive. Alternatively, the abrasive can be in the form of a preformed layer and applied to the plate 4 by a coating of a suitable adhesive.

A second plate 6 is positioned underneath and attached to the first plate 5, as shown most clearly in FIG. 3. Resilient means such as rubber grommets 7 are positioned between plates 4 and 6 adjacent to the two ends thereof to interconnect the plates. The grommets contain a pair of studs 8 and 9 embedded therein having enlarged ends 10 and 11 to anchor the studs within the grommets through which the grommets are connected to plates 4 and 6. In the arrangement illustrated, the stud 9 has a nut 12 attached to its lower extremity on the underside of plate 6. To accommodate looms of different sizes, however, the upper stud 8 preferably is threadedly attached to plate 4 through threaded hole 13. Alternatively, of course, studs 8 may be welded to plate 4.

Since the top plate 4 is connected to the second plate 6 through the resilient grommets 7, plate 4 and the loom supported thereon are free to move relative to plate 6 which permits the loom to vibrate during normal operation in a plane parallel to the floor on which it is supported without the vibrations being transmitted to the floor. As previously, indicated, the grommets are formed of a resilient material, neoprene rubber being one example. Other such materials may also be used, however, including any of the available synthetic rubbers such as butadiene styrene rubber.

The assembly also includes bearing means 15 positioned between plates 4 and 6 to help support plate 4 when the loom or other machine is mounted thereon. During operation, plate 4, which will vibrate with the loom, will contact the upper surface of bearing means 15, sliding there-across as the loom vibrates, which helps to keep the loom from moving off of plate 4 and also helps to prevent rocking of the loom and mounting assembly on the floor. The bearing means are attached to plate 6 preferably by countersunk rivets 16, although other standard attachment means can also be used if desired.

The bearing means 15 are formed of a material which has a low coefficient of friction, one suitable example being polytetrafluoroethylene ("Teflon"). Other suitable examples include nylon containing molybdenum disulfide and high molecular weight polyethylene such as that sold by Commercial Plastics under the tradename "Conco UHMW 1,900."

The assembly also preferably includes a pair of vibration pads 20 positioned underneath plate 6 at its two ends in substantial alignment with the resilient grommets 7. The vibration pads can be formed of a material such as neoprene cork and are bonded to the underside of plate 6 by any suitable adhesive. The pads include a hole 21 to accommodate nuts 12 attached to studs 9. The vibration pads help to prevent the loom end mounting assembly from "walking" when the loom vibrates during operation and also facilitates dampening or suppression of the vertical vibrations. If desired, the vibration pads may be bonded to the mill floor to help retain the loom and mounting assembly in a fixed position.

Shims, such as standard washers, may be positioned beneath the resilient grommet between the grommets and the top surface of plate 6, such as shown by numeral 23, to accommodate looms of different weights. Shimming the top plate away from the lower plate, results in the loom compressing the grommet changing the spring rate of the resilient material of the grommets, thereby allowing heavy looms to have similar characteristics to the lighter looms.

As shown in FIG. 3, the second plate 6 is, in one form, of an angular configuration comprising flat sections 6' adjacent the two ends and in the central portion thereof and interconnected by angular sections 6''. This is but one form which may suitably be used, however, as the plate may also be substantially flat throughout its length, in which case bearing means of greater thickness could be used to function as described. Alternatively, plate 6, could have a third plate welded or otherwise attached thereto spaced vertically therefrom between plates 4 and 6 with the bearing means attached to the third plate.

In FIG. 5, a further embodiment of the mounting assembly is illustrated which utilizes a single resilient grommet 30 positioned between plates 31 and 32. The upper plate 31 has an abrasive coating 33 thereon, and the loom foot would be positioned upon the abrasive coating as described previously. The resilient grommet is of the same construction as shown in FIG. 3 and includes studs 34 and 35 connecting the grommet to plates 31 and 32, respectively. In this embodiment, bearing means 36 are provided adjacent the ends of plates 31 and 32 and are attached to plate 32 by countersunk rivets 37. Vibration pads 38 are also provided underneath plate 32 at the ends thereof. The mounting assembly is otherwise essentially the same as the embodiment of FIGS. 2 through 4 and hence will not be further described.

When the loom is operated, it will vibrate laterally in a plane parallel to the floor without substantial restriction since the resilient grommets are attached to the upper and lower plates by independent and unconnected studs embedded therein. The resilient grommets thus take the actual vibration load of the loom in the form of a shear force as the loom is allowed to slide back and forth. The natural dampening of the resilient grommets also takes the shock load out of the loom beat-up motion and thus eliminates transmission of the vibrations to the mill floor.

Although the mounting assembly has been illustrated and described principally for use with a loom, the assembly can, of course, be used to mount other machines, as for example a flat bed knitting machine, wherein vibration caused by normal operation is a significant problem. By the same token, a plurality of mounting assemblies can be used in tandem or physically interconnected such as with an I - beam, if desired, to mount and support a machine.

We claim:

1. An assembly for mounting looms and the like to control the vibration thereof during operation, comrpising a first plate adapted to support a loom foot on one surface thereof, a second plate positioned beneath said first plate, and resilient means positioned between and interconnecting said first and second plates, said resilient means comprising at least one grommet attached to said first and second plates by a pair of independent studs which are embedded therein and protrude vertically therefrom, said first and second plates being attached to said grommet by engagement of said plates with said studs, whereby said first plate and a loom supported thereon are permitted to vibrate in a plane parallel to said second plate, and bearing means positioned between said first and second plates to provide a surface for said first plate to slide across when such loom is operated.

2. The assembly of claim 1 in which said bearing means are formed of a material having a low coefficient of friction.

3. The assembly of claim 2 in which said bearing means are formed of polytetrafluoroethylene.

4. The assembly of claim 1 in which said first plate includes a coating of abrasive on one surface thereof.

5. The assembly of claim 1 in which a shim is positioned between said resilient means and said second plate to accommodate machines of different weights.

6. The assembly of claim 1 including vibration pads positioned underneath said second plate adjacent the ends thereof to support the same and to assist in dampening vertical vibrations produced by operation of the loom.

7. An assembly for mounting looms and the like to control vibrations produced during opration, comprising a first plate adapted to support a loom foot on the upper surface thereof, a second plate positioned beneath said first plate, a pair of resilient grommets attached to and positioned between said first and second plates adjacent the ends thereof to interconnect said first and second plates and to support said first plate in operative position, said grommets including independent studs embedded therein and protruding vertically therefrom and attached to said first and second plates by engagement of said studs with said plates, and bearing means positioned between said first and second plates to provide a surface for said first plate to slide across when such loom is operated.

8. The assembly of claim 7 in which said first plate includes a coating of abrasive on its upper surface.

9. The assembly of claim 1 in said resilient means comprise a single rubber grommet positioned between and attached to said first and second plates substantially centrally of the length of said plates, and bearing means positioned between said first and second plates on opposite sides of said grommet to provide a surface for said first plate to slide across when such loom is operated.

10. The assembly of claim 7 in which said grommets are rubber and said bearing means are formed of a material having a low coefficient of friction.

11. The assembly of claim 7 in which a shim is positioned between said resilient means and said second plate to accommodate looms of different weight.

12. The assembly of claim 7 including vibration pads positioned underneath said second plate adjacent the ends thereof to support the same and to assist in dampening vertical vibrations produced by operation of the loom.

* * * * *